May 13, 1924.  1,494,264
A. K. McLEOD
JACK
Filed Sept. 8, 1923  2 Sheets-Sheet 1
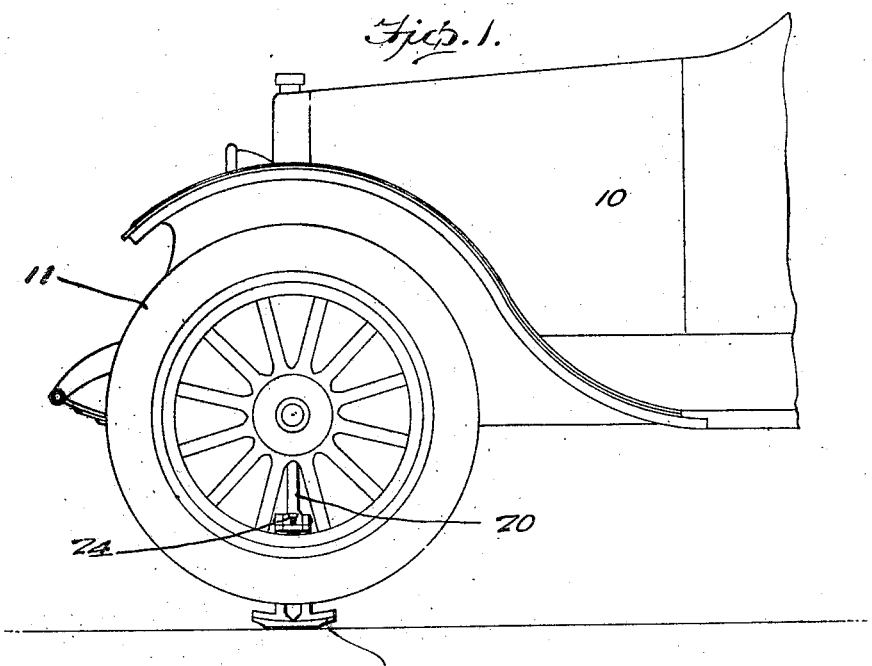
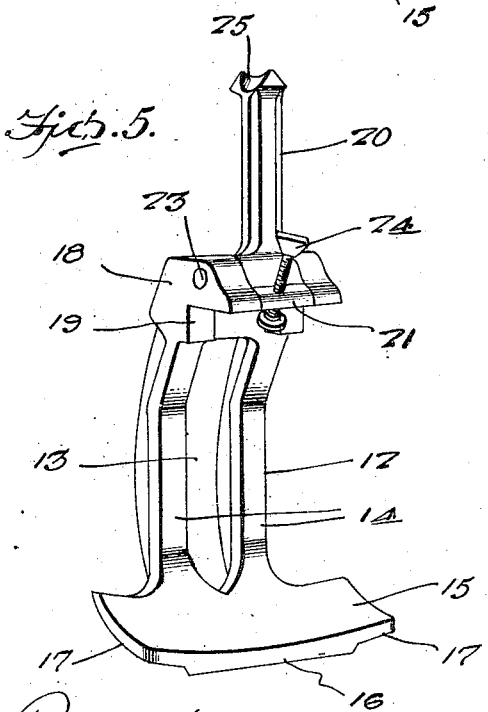
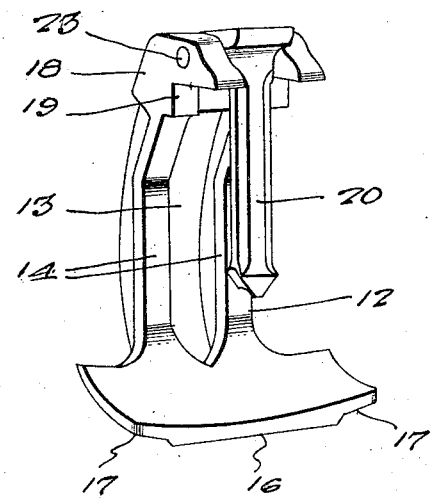
A. K. McLeod
INVENTOR
BY Victor J. Evans
ATTORNEY
WITNESS:

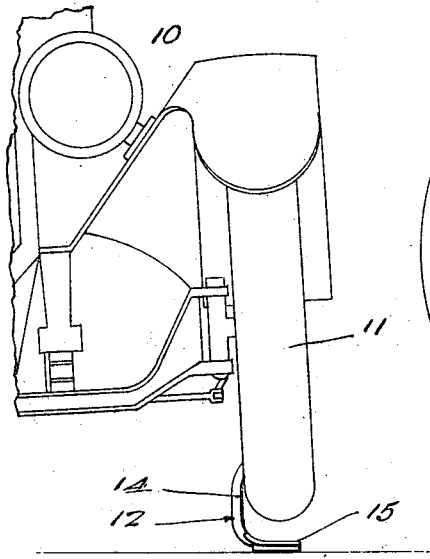
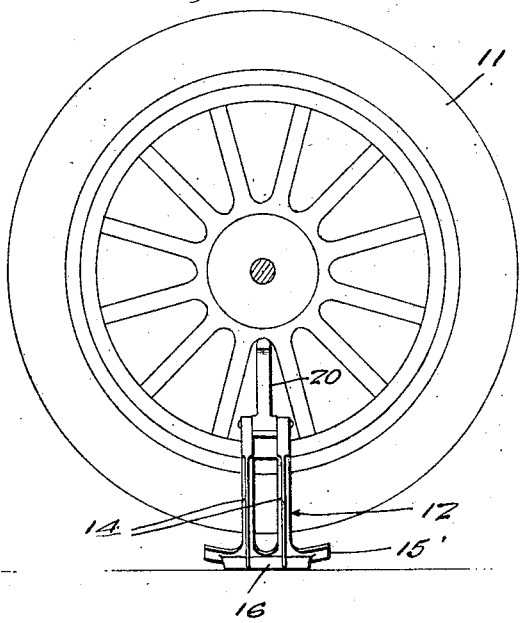
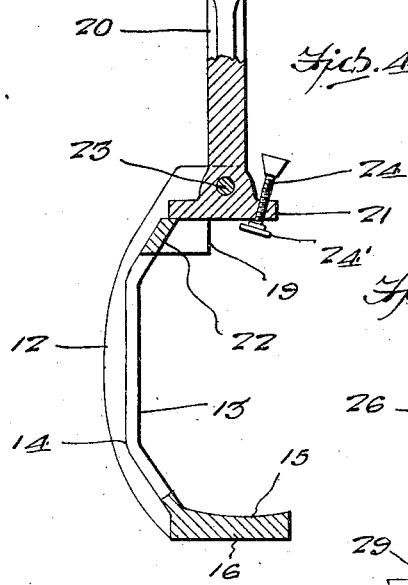
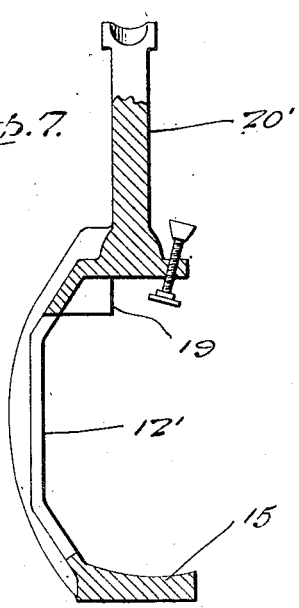
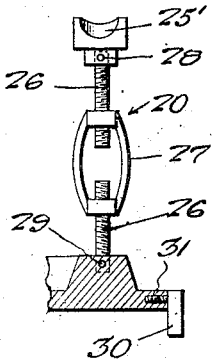

Patented May 13, 1924.

1,494,264

UNITED STATES PATENT OFFICE.

ARCHIE K. McLEOD, OF CHARLOTTE, NORTH CAROLINA.

JACK.

Application filed September 8, 1923. Serial No. 661,650.

*To all whom it may concern:*

Be it known that I, ARCHIE K. McLEOD, a citizen of the United States, residing at Charlotte, in the county of Mecklenburg and State of North Carolina, have invented new and useful Improvements in Jacks, of which the following is a specification.

This invention relates to improvements in jacks especially adapted for lifting vehicle wheels.

An object of the present invention is the provision of a jack which will operate to lift a vehicle wheel when the vehicle is moved forward or rearward, thus obviating the necessity of manual operation of the jack.

Another object of the invention is the provision of a jack which may be attached to an automobile wheel and the automobile moved under its own power, with the result that the wheel will be lifted into proper position and supported for the removal and replacement of a tire.

A further object of the invention is the provision of novel means for securing the jack in position, whereby the said jack may be quickly attached without injury to the wheel or tire.

With the above and other objects in view, the invention further includes the following novel features and details of construction, to be hereinafter more fully described, illustrated in the accompanying drawings and pointed out in the appended claims.

In the drawings:—

Figure 1 is a side elevation of a portion of an automobile with the invention applied and in use.

Figure 2 is a front view of the same.

Figure 3 is a view looking at the opposite face of the wheel from that shown in Figure 1.

Figure 4 is an enlarged vertical sectional view.

Figure 5 is a perspective view of the jack.

Figure 6 is a similar view showing the jack folded.

Figure 7 is a vertical sectional view showing a modified form of the invention.

Figure 8 is a fragmentary view illustrating an extensible hub engaging arm.

Referring to the drawings in detail wherein like characters of reference denote corresponding parts, the reference character 10 indicates a portion of an automobile, one wheel of which is shown at 11.

The jack which comprises the present invention is shown as attached to the wheel and is formed of a body 12, which in the present instance is divided as shown at 13 so as to provide spaced parallel standards 14. These standards rise from one side of a base 15, so that the said standards and base are relatively offset and the latter is provided with a relatively wide bearing surface 16 which is curved upwardly at each end as shown at 17.

The body 12 has extending inwardly from its upper end an offset portion 18 which is arranged substantially parallel with the base 15 and which is provided with an angular seat 19 which receives the felly of the wheel 11. The offset portion 18 forms a head which is bifurcated to receive one end of an arm 20, the said end being provided with an offset portion 21 which has one face substantially flush with a portion of the seat 19. The inner end of the arm 20 bears against a bar 22 which connects the upper end of the standards 14 of the body and which provides a stop against which the inner end of the arm 20 bears. The arm 20 is pivotally secured to the body as shown at 23 and the bar 22 limits its pivotal movement in one direction. The offset portion 21 of the arm 20 carries a set screw 24 which, when the device is secured in position is adapted to engage the felly.

The opposite or outer end of the arm 20 is provided with oppositely extending inclined concaved seats 25 which are adapted to engage the inner portions of the spokes of the wheel 11 and to snugly fit within the crotch of the spokes at this point.

In securing the jack in place it is positioned so that the outer end of the arm 20 will be positioned between the spokes and the felly will engage the seat 19, whereupon the set screw 24 may be adjusted to tightly force the arm in engaged position. It is preferable to secure the device at a point aproximately opposite the stem of the tire valve and forward of the vehicle, so that the latter may be moved slightly forward to cause the base 15 to engage the ground, whereupon the vehicle will ride upward with the jack in vertical position and the wheel elevated for the removal and replacement of a tire. When the device is not in use, the arm may be folded as shown in the drawings so as to occupy small storage space.

The set screw 24 is preferably provided with a swiveled head 24' for engagement with the wheel felly.

If desired, the arm 20' may be made integral with the body 12' as shown in Figure 7 of the drawings. In other respects the structure of the device shown in this figure is the same as in the preceding figures.

In Figure 8 of the drawings there is illustrated an extensible or adjustable arm 20ª. This arm is of sectional formation and includes threaded shanks 26 which are adjustably connected by a turn buckle 27. One of said shanks has pivotally connected thereto as shown at 28 a head 25', while the other shank is pivotally secured to the body of the jack as shown at 29.

If desired, the set screw 24 may be dispensed with and a stop 30 may be adjustably secured to the jack so as to provide a latch or shoulder to cooperate with the angular seat 19 to engage the wheel felly. The stop 30 is eccentrically pivoted to the jack and this pivot may be in the form of a threaded stud 31 so that the stop may tightly engage the side of the felly.

The invention is susceptible of various changes in its form, proportions and minor details of construction and the right is herein reserved to make such changes as properly fall within the scope of the appended claims.

Having described the invention what is claimed is:—

1. A wheel jack comprising a body portion, an offset base carried thereby, means carried by the body portion for engagement with the felly of a wheel, an arm extending from the body portion radially between the spokes of the wheel, an offset portion at the inner end of the arm for contact with the felly, means carried at the outer end of the arm for engagement with the spokes near the inner ends of the latter and an adjusting screw extending through the offset portion of the arm and engaging the felly for clamping the arm in engaged position.

2. A wheel jack comprising a body portion, an offset base carried thereby, means carried by the body portion for engagement with the felly of a wheel, an arm pivotally secured to the body portion and adapted to extend radially between the spokes of the wheel, means carried by one end of the arm for engagement with the felly and means carried by the opposite end of the arm for engagement between the spokes near the inner ends of the latter.

In testimony whereof I affix my signature.

ARCHIE K. McLEOD.